(12) United States Patent
Tziovaras et al.

(10) Patent No.: US 12,365,775 B2
(45) Date of Patent: Jul. 22, 2025

(54) PROCESS FOR PARTIAL COLOURING OF PLASTIC PARTS USING SOLID COLOURANTS IN COLOUR- CARRIER LAYERS

(71) Applicant: Covestro Deutschland AG, Leverkusen (DE)

(72) Inventors: Georgios Tziovaras, Neuss (DE); Heinz Pudleiner, Krefeld (DE); Roland Kuenzel, Leverkusen (DE); Florian Stempfle, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 18/553,752

(22) PCT Filed: Apr. 11, 2022

(86) PCT No.: PCT/EP2022/059577
§ 371 (c)(1),
(2) Date: Oct. 3, 2023

(87) PCT Pub. No.: WO2022/218900
PCT Pub. Date: Oct. 20, 2022

(65) Prior Publication Data
US 2024/0209169 A1 Jun. 27, 2024

(30) Foreign Application Priority Data
Apr. 14, 2021 (EP) ..................... 21168398

(51) Int. Cl.
| | |
|---|---|
| C08J 7/00 | (2006.01) |
| B41M 5/00 | (2006.01) |
| B41M 5/035 | (2006.01) |
| B41M 5/26 | (2006.01) |
| B41M 5/382 | (2006.01) |
| B41M 5/385 | (2006.01) |
| B42D 25/41 | (2014.01) |
| C08J 7/06 | (2006.01) |

(52) U.S. Cl.
CPC ............ C08J 7/065 (2013.01); B41M 5/0052 (2013.01); B41M 5/0064 (2013.01); B41M 5/0358 (2013.01); B41M 5/267 (2013.01); B41M 5/38235 (2013.01); B41M 5/385 (2013.01); B42D 25/41 (2014.10); B41M 2205/04 (2013.01); B41M 2205/06 (2013.01); B41M 2205/30 (2013.01); C08J 2369/00 (2013.01)

(58) Field of Classification Search
CPC .... C08J 7/065; C08J 2369/00; B41M 5/0052; B41M 5/0064; B41M 5/0358; B41M 5/267; B41M 5/38235; B41M 5/385; B41M 2205/04; B41M 2205/06; B41M 2205/30; B41M 5/035; B41M 5/38207; B42D 25/41

USPC ............................................................ 8/444
See application file for complete search history.

(56) References Cited

U.S. PATENT DOCUMENTS

| | | | |
|---|---|---|---|
| 3,692,744 A | 9/1972 | Rich et al. | |
| 4,086,212 A | 4/1978 | Bier et al. | |
| 4,107,149 A | 8/1978 | Bier et al. | |
| 4,176,224 A | 11/1979 | Bier et al. | |
| 5,240,900 A | 8/1993 | Burberry | |
| 5,714,249 A | 2/1998 | Yoshida et al. | |
| 5,733,651 A | 3/1998 | Wank et al. | |
| 7,771,646 B2 | 8/2010 | Clauss et al. | |
| 7,793,846 B2 | 9/2010 | Jones | |
| 8,980,135 B2 | 3/2015 | Takeda et al. | |
| 10,131,178 B2 | 11/2018 | Pudleiner et al. | |
| 10,662,581 B2 * | 5/2020 | Tziovaras ............ | B32B 27/302 |
| 2019/0106837 A1 * | 4/2019 | Tziovaras ............ | B32B 27/286 |

FOREIGN PATENT DOCUMENTS

| | | | |
|---|---|---|---|
| CN | 1415481 A | 5/2003 | |
| CN | 110785288 A * | 2/2020 | ............ B41M 5/267 |
| DE | 3832396 A1 | 2/1990 | |
| EP | 2752302 A | 7/2014 | |

(Continued)

OTHER PUBLICATIONS

Kunststoff-Handbuch, vol. VIII, p. 695 ff., Karl-Hanser-Verlag, Munich 1973.

H. Schnell, "Chemistry and Physics of Polycarbonates", Polymer Reviews, vol. 9, Interscience Publishers, New York, London, Sydney 1964.

(Continued)

Primary Examiner — Eisa B Elhilo
(74) Attorney, Agent, or Firm — John E. Mrozinski, Jr.

(57) ABSTRACT

The invention relates to a process for partial colouring, in particular colour laser engraving, of plastic parts, preferably of thermoplastic parts, very particularly preferably of thermoplastic parts comprising a layer construction, comprising the steps of: i) providing a plastic part (A) having at least one surface; ii) laying a colour tape atop at least one portion of the at least one surface of the plastic part (A) to obtain a surface of the plastic part (A) covered with the colour tape; iii) irradiating the plastic part (A) from ii) with focused, preferably nonionizing, electromagnetic radiation (C) on at least one portion of the surface of the plastic part (A) covered with the colour tape, wherein the partial colouring is effected essentially only at the sites on the plastic part (A) irradiated in step iii), wherein the wavelength range of the focused, preferably nonionizing, electromagnetic radiation (C) is in a range from 200 to 20 000 nm, preferably in a range from 300 to 18 000 nm, particularly preferably in a range from 350 to 16 000 nm.

14 Claims, No Drawings

(56) References Cited

FOREIGN PATENT DOCUMENTS

| | | | |
|---|---|---|---|
| EP | 3613602 A1 * | 2/2020 | ............ B41M 5/267 |
| GB | 1229482 A | 4/1971 | |
| GB | 2083726 A | 3/1982 | |
| JP | 2008214596 A | 9/2008 | |
| JP | 2012011688 A | 1/2012 | |
| JP | 2012011689 A | 1/2012 | |
| WO | 9738865 A1 | 10/1997 | |
| WO | 200450766 A1 | 6/2004 | |
| WO | 200450767 A1 | 6/2004 | |
| WO | WO 2017167651 A1 * | 10/2017 | ............. B32B 27/08 |
| WO | WO 2019002118 A1 * | 1/2019 | ............. B41M 5/267 |
| WO | WO 2020039018 A1 * | 2/2020 | ............. B42D 25/23 |

OTHER PUBLICATIONS

D. Freitag et al., Bayer AG, "Polycarbonates", Encyclopedia of Polymer Science and Engineering, vol. 11, second edition, 1988, pp. 648-718.

J. Grigo et al., "Polycarbonate" in Becker/Braun, Kunststoff-Handbuch, vol. 3/1, Polycarbonate, Polyacetale, Polyester, Celluloseester, Carl Hanser Verlag Munich, Vienna 1992, pp. 117-299.

D. G. Legrand et al., Handbook of Polycarbonate Science and Technology, Marcel Dekker New York 2000, p. 72 ff.

K. Adachi et al., J. Am. Ceram. Soc. 2008, 91, pp. 2897-2902.

K. Adachi et al. J. Am. Ceram. Soc. 2007, 90, pp. 4059-4061.

International Search Report, PCT/EP2022/059577, date of mailing: Jul. 14, 2022, Authorized officer: Daniela Zacchini.

\* cited by examiner

PROCESS FOR PARTIAL COLOURING OF PLASTIC PARTS USING SOLID COLOURANTS IN COLOUR- CARRIER LAYERS

CROSS REFERENCE TO RELATED APPLICATIONS

This application is a national stage application under 35 U.S.C. § 371 of PCT/EP2022/059577, filed Apr. 11, 2022, which claims benefit of EP application Ser. No. 21/168, 398.2, filed Apr. 14, 2021, both of which are incorporated herein by reference in their entireties.

Field of the Invention

The present invention relates to a process for partial coloring, in particular for color laser engraving using a color ribbon, of plastic parts, in particular thermoplastic plastic parts, very particularly thermoplastic plastic parts comprising a layer construction, to the resulting partially colored, preferably color laser engraved, plastic parts, in particular thermoplastic plastic parts and to the use of such colored plastic parts in security documents.

Background of the Invention

The option of color laser engraving plastic parts is of interest for the entire plastic parts manufacturing industry. Of interest here is colored laser engraving of three-dimensionally formed plastic parts, for example for the automotive industry. Thus for example switches, trim pieces etc. may be engraved with colored symbols. Plastic parts comprising a lacquer for surface protection therof may also be color laser engraved. The laser beam removes the lacquer layer and the dye simultaneously migrates into the plastic surface at this site. Unprotected plastic surfaces may also be color laser engraved and subsequently lacquered to ensure an uninterrupted shiny appearance of the plastic parts and provide protection against scratches and chemical damage. Such colored symbols have hitherto been producable for example by plastic injection molding with a plurality of colored components in the first manufacturing step. In a second manufacturing step the plastic parts must be lacquered with a covering ink. In a third manufacturing step the color layer must be laser engraved to reveal the plastic surface therebelow. A protective lacquer may optionally be applied in a fourth manufacturing step.

Alternatively, transparent plastic films may be color engraved on their reverse and subsequently subjected to film insert molding with a thermoplastic to obtain surfaces which are shiny or have a uniform appearance. This process is described for example in EP-A 0691201 example 1.

In the market for security and/or value documents, in particular identification documents (ID documents), there is a need for colored personalization of these documents by means of lasers. Recent years have seen the development, especially in the field of security and/or value documents, in particular ID documents, of processes that make it possible to generate colored elements in these documents that are entirely or partially constructed from polymer films. These processes are described, for example, in WO-A 03/056507. EP-A 2752302 or JP-A 2012-011688, but are associated with considerable technical complexity. All processes include a printing process to realize the coloring. This also includes the processes described in U.S. Pat. No. 5,714,249 A1 or in CN 1415481 A.

WO-A 2017/167651 discloses a process for partial coloring, in particular for color laser engraving, of plastic parts, in particular thermoplastic plastic parts, very particularly plastic films.

WO-A 03/056507 discloses a process in which a colored image is formed on a film by laser engraving. To this end a surface on which a colored image is later to be formed is printed over its entire area with an ink which interacts with a certain wavelength of laser light. The reaction manifests in the bleaching of the color pigments as soon as these are exposed by the laser. If three types of pigments, for example red, yellow, blue, interacting at three different wavelengths are used it is possible to generate full-color images. However, this process is particularly complex since three different laser sources having different wavelengths must be used and the ink must be printed onto the surface over its entire area. This has the result that the laminate adhesion of the films after lamination is not good in the region of the image.

JP-A 2012-011689 discloses a method and an apparatus for color laser printing on moldings without damaging the substrate. In this process the ink is applied to the molding by inkjet and then this ink is fixed on the molding using a laser beam. Here too, the complete molding is initially sprayed with ink.

GB 2083726 A describes multicolored donor elements which make ink transferable onto substrates by heating. U.S. Pat. No. 5,241,900 and WO97/38865 also describe a laser light absorber in the donor element.

WO 2017167651 A1 describes the transfer of dye onto substrates from a dyeing bath.

However, disadvantages of the described processes include high resource intensity and the sharpness and positional accuracy of the resulting partial coloring, in particular of the resulting color laser engraving.

DETAILED DESCRIPTION OF THE INVENTION

It is accordingly an object of the present invention to provide an improved process for partial coloring, in particular for color laser engraving, of plastic parts, preferably of thermoplastic plastic parts, very particularly of thermoplastic plastic parts comprising a layer construction, for example plastic films and/or film layer laminates, wherein at least one disadvantage is at least partially improved.

It is a further object of the invention to be able to provide a rapid, sharp and uniformly intense coloring with high positional accuracy, in particular color laser engraving in plastic parts. It is a further object of the invention to provide a process for partial coloring of plastic parts which makes it possible to effect partial coloring of plastic parts that are sensitive to solvents, dyes or other additives.

This object was surprisingly achieved by the process according to the invention for partial coloring, in particular color laser engraving, of plastic parts, preferably of thermoplastic plastic parts, very particularly preferably of thermoplastic plastic parts comprising a layer construction, comprising the steps of:

i) providing a plastic part (A) having at least one surface;
ii) laying a color ribbon (B) containing at least one colorant, in particular a dye, on at least a portion of the at least one surface of the plastic part (A) to obtain a surface of the plastic part (A) covered with the color ribbon;
iii) irradiating the plastic part (A) from ii) with focused, preferably nonionizing, electromagnetic radiation (C)

on at least a portion of the surface of the plastic part (A) covered with the color ribbon, wherein the partial coloring is effected substantially only at the sites on the plastic part (A) that are irradiated in step iii), wherein the wavelength range of the focused, preferably nonionizing, electromagnetic radiation (C) is in a range from 200 to 20 000 nm, preferably in a range from 300 to 18 000 nm, particularly preferably in a range from 350 to 16 000 nm.

In the context of the present invention "substantially" is to be understood as meaning that a colored element which is clearly apparent to the naked eye as a visible colored element is formed only at the sites irradiated in step iii). The term "nonionizing radiation" is in the context of the present invention to be understood as meaning electromagnetic waves whose energy is insufficient to ionize other atoms since the energy quantum of the photons is below the bond energies of molecules or ionization energies of atoms. This can also include light sources which can in principle in certain wavelength ranges produce energy quanta to ionize atoms but are employed in an intensity range which precludes ionization of atoms.

The providing of the plastic part (A) in step i) may be any providing that would be selected for this purpose by a person skilled in the art. The providing is preferably laying, setting, positioning or constructing the plastic part (A) on a surface, such as a table.

The laying of the color ribbon (B) on at least a portion of the at least one surface of the plastic part (A) to obtain a surface of the plastic part (A) covered with the color ribbon (B) in step ii) may be effected in any manner selected for this purpose by those skilled in the art. The laying of the color ribbon is preferably carried out by generating a negative pressure between the color ribbon and the plastic part. The negative pressure is preferably in a range from 10 to 500 mbar, more preferably in a range from 50 to 400 mbar, below standard pressure which is defined as 1013 mbar. Alternatively or in addition the color ribbon (B) may be pressed onto the plastic part (A) with positive pressure, preferably with a pressure of 0.01 N/cm$^2$ to 100 N/cm$^2$.

The color ribbon (B) preferably has a width in a range from 5 mm to 100 cm, more preferably from 10 mm to 50 cm, more preferably from 1 to 20 cm. The color ribbon may have any desired length. The color ribbon preferably has a length in a range from 1 m to 1000 m, more preferably from 10 m to 500 m, more preferably from 50 to 100 m.

The irradiating in step iii) may be effected in any manner selected for this purpose by those skilled in the art. It is preferable when the preferably nonionizing electromagnetic radiation (C) is incident at an angle of 45° to 90° relative to the plane of the color ribbon (B), particularly preferably vertically ±10° to the color ribbon (B).

The energy transferred to the color ribbon and the plastic part (A) during the irradiation in step iii) is preferably in a range where other than the transfer of colorant from the color ribbon (B) to the plastic part (A) no material is transferred to the plastic part (A) or fused therewith.

The process according to the invention particularly has the feature that the partial coloring of the plastic part, in particular of the thermoplastic plastic part, very particularly of the thermoplastic plastic part comprising a layer construction, occurs in a particularly high intensity and high sharpness coloring substantially at the sites irradiated in step iii) of the process. The process according to the invention moreover has the feature of a great penetration depth of the colorant, in particular of the dye, into the plastic part. The penetration depth of the partial coloring is preferably in a range from 10 to 500 µm, more preferably in a range from 20 to 300 µm, particularly preferably in a range from 50 to 200 µm.

In a preferred embodiment of the process in a step iv) the color ribbon (B) is removed from the plastic part (A) after step iii). The removal of the color ribbon (B) in step iv) may be effected in any manner selected for this purpose by those skilled in the art. The color ribbon (B) is preferably removed by releasing the optionally applied negative pressure during laying of the color ribbon (B) in step ii). If no negative pressure was applied in step ii) the color ribbon (B) is removed either manually or by raising the roll-to-roll apparatus. It is alternatively possible to employ a removal means, such as air pressure or a lever for lifting the color ribbon (B) from the plastic part (A).

In a preferred embodiment the focused, preferably nonionizing, electromagnetic radiation (C) is laser radiation having a wavelength in the range from 500 to 15 000 nm, preferably in the range from 1000 to 10 000 nm, particularly preferably in the range from 1500 to 5000 nm.

The remainder of the plastic part (A) exhibits only very weak coloring, if any, at the nonirradiated regions. It is thus possible to color specific regions of the plastic part in order to apply to this plastic part by the process according to the invention for example an image, personalization, logo, symbol or script. These cannot be removed from the plastic surface without destroying the plastic part. The process according to the invention is thus especially suitable for producing security and identification documents.

Especially upon irradiation with laser radiation these colored elements achieve particularly high resolutions of ≥5000 dpi, preferably of ≥6000 dpi, particularly preferably of 5000 to 10 000 dpi. The process according to the invention requires neither a high-precision printing technique nor the use of different laser strengths, for example lasers emitting at different wavelengths, provided the irradiation in step iii) is carried out with laser radiation. In addition the process according to the invention is suitable for the application of colored elements both onto two- and/or three-dimensional plastic parts (A) and onto thermoplastic plastic parts (A) comprising a layer construction containing one or more layers of a thermoplastic plastic.

Highly focused laser systems can produce uninterrupted colored lines, a feature of security printing, preferably in a width of 10 µm. This has hitherto only been possible with processes requiring full wetting of the plastic part with the dye. The use of a color ribbon which is merely contacted with the plastic part (A) by laying prevents the remaining surface of the plastic part (A) from being concomitantly colored and requiring subsequent washing or freeing of dye with solvents. This is especially advantageous when the plastic part is sensitive to solvents, dyes or other additives that are used in conventional partial coloring.

In the case of three-dimensional molded plastic parts (A) the color ribbon may be laid directly on the plastic part (A) to be able to ensure color transfer.

In a preferred embodiment the plastic part (A), preferably the thermoplastic plastic part, very particularly preferably the thermoplastic plastic part comprising a layer construction, contains a thermoplastic plastic selected from polymers of ethylenically unsaturated monomers and/or polycondensates of bifunctional reactive compounds and/or polyaddition products of bifunctional reactive compounds. For certain applications, for example in the field of identification documents, it may be advantageous and hence preferred to use a transparent thermoplastic plastic, preferably in the form of plastic films.

Particularly suitable thermoplastic plastics are one or more polycarbonate(s) or copolycarbonate(s) based on diphenols, poly- or copolyacrylate(s) and poly- or copolymethacrylate(s) such as, by way of example and preferably, polymethylmethacrylate or poly(meth)acrylate (PMMA), polymer(s) or copolymer(s) with styrene such as, by way of example and preferably, polystyrene (PS), acrylonitrile-butadiene-styrene (ABS), or polystyrene-acrylonitrile (SAN), thermoplastic polyurethane(s) and also polyolefin(s) such as, by way of example and preferably, polypropylene types or polyolefins based on cyclic olefins (e.g. TOPAS®, Hoechst), poly- or copolycondensate(s) of terephthalic acid such as, by way of example and preferably, poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), polyamide (PA), poly- or copolycondensate(s) of naphthalenedicarboxylic acid such as, by way of example and preferably, polyethylene glycol naphthalate (PEN), poly- or copolycondensate(s) of at least one cycloalkyldicarboxylic acid such as, by way of example and preferably, polycyclohexanedimethanolcyclohexanedicarboxylic acid (PCCD), polysulfones (PSU), mixtures of at least two of the aforementioned or blends of at least two thereof.

Preferred thermoplastic plastics are polycarbonates or copolycarbonates having average molecular weights Mw of 500 to 100 000 g/mol, preferably from 10 000 to 80 000 g/mol, particularly preferably of 15 000 to 40 000 g/mol.

Particularly preferred thermoplastics are one or more polycarbonate(s) or copolycarbonate(s) based on diphenols or blends containing at least one polycarbonate or copolycarbonate. Very particular preference is given to blends containing at least one polycarbonate or copolycarbonate and at least one poly- or copolycondensate of terephthalic acid, of naphthalenedicarboxylic acid or of a cycloalkyldicarboxylic acid, preferably of cyclohexanedicarboxylic acid.

Preferred thermoplastic plastics are polycarbonates or copolycarbonates, especially having average molecular weights Mw of 500 to 100 000 g/mol, preferably of 10 000 to 80 000 g/mol, particularly preferably of 15 000 to 40 000 g/mol, or blends thereof with at least one poly- or copolycondensate of terephthalic acid having average molecular weights Mw of 10 000 to 200 000 g/mol, preferably of 21 000 to 120 000 g/mol.

Suitable poly- or copolycondensates of terephthalic acid in preferred embodiments of the invention are polyalkylene terephthalates. Suitable polyalkylene terephthalates are for example reaction products of aromatic dicarboxylic acids or the reactive derivatives thereof (e.g. dimethyl esters or anhydrides) and aliphatic, cycloaliphatic or araliphatic diols, and mixtures of these reaction products.

Preferred polyalkylene terephthalates may be prepared from terephthalic acid (or reactive derivatives thereof) and aliphatic or cycloaliphatic diols having 2 to 10 carbon atoms by known methods (Kunststoff-Handbuch, vol. VIII, p. 695 ff, Karl-Hanser-Verlag, Munich 1973).

Preferred polyalkylene terephthalates contain at least 80 mol %, preferably 90 mol %, of terephthalic acid radicals, based on the dicarboxylic acid component, and at least 80 mol %, preferably at least 90 mol %, of ethylene glycol and/or butane-1,4-diol and/or cyclohexane-1,4-dimethanol radicals based on the diol component.

The preferred polyalkylene terephthalates may contain, in addition to terephthalic acid radicals, up to 20 mol % of radicals of other aromatic dicarboxylic acids having 8 to 14 carbon atoms or of aliphatic dicarboxylic acids having 4 to 12 carbon atoms, such as for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may contain, in addition to ethylene and/or butane-1,4-diol glycol radicals, up to 80 mol % of other aliphatic diols having 3 to 12 carbon atoms or of cycloaliphatic diols having 6 to 21 carbon atoms, for example radicals of propane-1,3-diol, 2-ethylpropane-1,3-diol, neopentyl glycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, hexane-2,5-diol, 1,4-di([beta]-hydroxyethoxy)benzene, 2,2-bis(4-hydroxycyclohexyl)propane, 2,4-dihydroxy-1,1,3,3-tetramethylcyclobutane, 2,2-bis(3-[beta]-hydroxyethoxyphenyl)propane and 2,2-bis(4-hydroxypropoxyphenyl)propane (cf. DE-A 25 07 674, 25 07 776, 27 15 932).

The polyalkylene terephthalates may be branched by incorporation of relatively small amounts of tri- or tetrahydric alcohols or tri- or tetrabasic carboxylic acids, as described for example in DE-A 19 00 270 and U.S. Pat. No. 3,692,744. Examples of preferred branching agents are trimesic acid, trimellitic acid, trimethylolethane and trimethylolpropane and pentaerythritol. It is preferable when not more than 1 mol % of the branching agent is used, based on the acid component.

Particular preference is given to polyalkylene terephthalates which have been produced solely from terephthalic acid and the reactive derivatives thereof (e.g. the dialkyl esters thereof) and ethylene glycol and/or butane-1,4-diol and/or cyclohexane-1,4-dimethanol radicals, and to mixtures of these polyalkylene terephthalates.

Preferred polyalkylene terephthalates further include copolyesters produced from at least two of the abovementioned acid components and/or from at least two of the abovementioned alcohol components; particularly preferred copolyesters are poly(ethylene glycol/butane-1,4-diol) terephthalates.

The polyalkylene terephthalates preferably used as component preferably have an intrinsic viscosity of about 0.4 to 1.5 dl/g, preferably 0.5 to 1.3 dl/g, measured in each case in phenol/o-dichlorobenzene (1:1 parts by weight) at 25° C.

In particularly preferred embodiments of the invention the blend of at least one polycarbonate or copolycarbonate with at least one poly- or copolycondensate of terephthalic acid is a blend of at least one polycarbonate or copolycarbonate with poly- or copolybutylene terephthalate or glycol-modified poly- or copolycyclohexanedimethylene terephthalate. Such a blend of polycarbonate or copolycarbonate with poly- or copolybutylene terephthalate or glycol-modified poly- or copolycyclohexanedimethylene terephthalate may preferably be one comprising 1% to 90% by weight of polycarbonate or copolycarbonate and 99% to 10% by weight of poly- or copolybutylene terephthalate or glycol-modified poly- or copolycyclohexanedimethylene terephthalate, preferably comprising 1% to 90% by weight of polycarbonate and 99% to 10% by weight of polybutylene terephthalate or glycol-modified polycyclohexanedimethylene terephthalate, wherein the proportions add up to 100% by weight. Such a blend of polycarbonate or copolycarbonate with poly- or copolybutylene terephthalate or glycol-modified poly- or copolycyclohexanedimethylene terephthalate may more preferably be one comprising 20% to 85% by weight of polycarbonate or copolycarbonate and 80% to 15% by weight of poly- or copolybutylene terephthalate or glycol-modified poly- or copolycyclohexanedimethylene terephthalate, preferably comprising 20% to 85% by weight of polycarbonate and 80% to 15% by weight of polybutylene terephthalate or glycol-modified polycyclohexanedimethylene terephthalate, wherein the proportions add up to 100% by weight. Such a blend of polycarbonate or copolycarbonate with poly- or copolybutylene terephthalate or glycol-modified poly- or copolycyclohexanedimethylene terephthalate may most preferably be one comprising 35% to 80% by weight of polycarbonate or copolycarbonate and 65% to 20% by weight of poly- or copolybutylene terephthalate or glycol-modified poly- or copolycyclohexanedimethylene terephthalate, preferably comprising 35% to 80% by weight of polycarbonate and 65% to 20% by weight of polybutylene terephthalate or glycol-modified polycyclohexanedimethylene terephthalate, wherein the proportions add up to 100% by weight. Very particularly preferred embodiments may involve blends of polycarbonate and glycol-modified polycyclohexanedimethylene terephthalate in the aforementioned compositions.

Suitable polycarbonates or copolycarbonates include in particular aromatic polycarbonates or copolycarbonates. The polycarbonates or copolycarbonates may be linear or branched in known fashion. These polycarbonates may be produced in known fashion from diphenols, carbonic acid derivatives, optionally chain terminators and optionally branching agents. Particulars pertaining to the production of polycarbonates are disclosed in many patent documents spanning approximately the last 40 years. Reference is made here merely by way of example to Schnell, "Chemistry and Physics of Polycarbonates", Polymer Reviews, volume 9, Interscience Publishers, New York, London, Sydney 1964, to D. Freitag, U. Grigo, P. R. Müller, H. Nouverté, BAYER AG, "Polycarbonates" in Encyclopedia of Polymer Science and Engineering, volume 11, second edition, 1988, pages 648-718 and finally to Dres. U. Grigo, K. Kirchner and P. R. Müller, "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Suitable diphenols may be, for example, dihydroxyaryl compounds of general formula (I)

wherein Z is an aromatic radical having 6 to 34 carbon atoms which may contain one or more optionally substituted aromatic rings and aliphatic or cycloaliphatic radicals or alkylaryls or heteroatoms as bridging members.

Examples of suitable dihydroxyaryl compounds include: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis(hydroxyphenyl) sulfones, bis(hydroxyphenyl) sulfoxides, 1,1'-bis(hydroxyphenyl)diisopropylbenzenes and the ring-alkylated and ring-halogenated compounds thereof.

These and further suitable other dihydroxyaryl compounds are described, for example, in DE-A 3 832 396, FR-A 1 561 518, in H. Schnell, Chemistry and Physics of Polycarbonates, Interscience Publishers, New York 1964, p. 28 ff.; p. 102 ff., and in D. G. Legrand, J. T. Bendler, Handbook of Polycarbonate Science and Technology, Marcel Dekker New York 2000, p. 72 ff.

Preferred dihydroxyaryl compounds are, for example, resorcinol, 4,4'-dihydroxydiphenyl, bis(4-hydroxyphenyl) methane, bis(3,5-dimethyl-4-hydroxyphenyl)methane, bis (4-hydroxyphenyl)diphenyl-methane, 1,1-bis(4-hydroxyphenyl)-1-phenylethane, 1,1-bis(4-hydroxyphenyl)-1-(1-naphthyl)ethane, 1,1-bis(4-hydroxyphenyl)-1-(2-naphthyl) ethane, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)-1-phenylpropane, 2,2-bis(4-hydroxyphenyl)hexafluoropropane, 2,4-bis(4-hydroxyphenyl)-2-methyl-butane, 2,4-bis(3,5-dimethyl-4-hydroxyphenyl)-2-methylbutane, 1,1-bis(4-hydroxyphenyl)cyclo-hexane, 1,1-bis(3,5-dimethyl-4-hydroxyphenyl)cyclohexane, 1,1-bis(4-hydroxyphenyl)-4-methylcyclo-hexane, 1,3-bis[2-(4-hydroxyphenyl)-2-propyl]benzene, 1,1'-bis(4-hydroxyphenyl)-3-diisopropylbenzene, 1,1'-bis(4-hydroxyphenyl)-4-diisopropylbenzene, 1,3-bis[2-(3,5-dimethyl-4-hydroxyphenyl)-2-propyl]benzene, bis(4-hydroxyphenyl) ether, bis(4-hydroxyphenyl) sulfide, bis(4-hydroxyphenyl) sulfone, bis(3,5-dimethyl-4-hydroxyphenyl) sulfone and 2,2',3,3'-tetrahydro-3,3,3',3'-tetramethyl-1,1'-spirobi[1H-indene]-5,5'-diol or dihydroxydiphenylcycloalkanes of the formula (Ia)

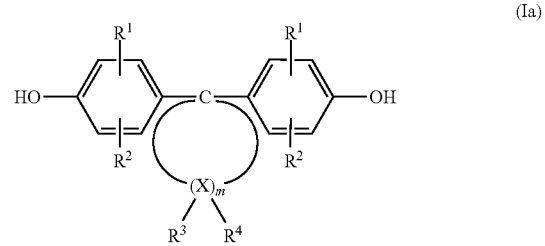

where
$R^1$ and $R^2$ are independently hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, especially benzyl,
m is an integer from 4 to 7, preferably 4 or 5,
$R^3$ and $R^4$ can be chosen individually for each X and are independently hydrogen or $C_1$-$C_6$-alkyl and
X is carbon,
with the proviso that, on at least one atom X, $R^3$ and $R^4$ are both alkyl. Preferably, in the formula (Ia), on one or two X atom(s), especially only on one X atom, $R^3$ and $R^4$ are both alkyl.

A preferred alkyl radical for the $R^3$ and $R^4$ radicals in formula (Ia) is methyl. The X atoms alpha to the diphenyl-substituted carbon atom (C-1) are preferably not dialkyl-substituted but the alkyl disubstitution beta to C-1 is preferred.

Particularly preferred dihydroxydiphenylcycloalkanes of formula (Ia) are those having 5 and 6 ring carbon atoms X in the cycloaliphatic radical (m=4 or 5 in formula (Ia)), for example the diphenols of formulae (Ia-1) to (Ia-3),

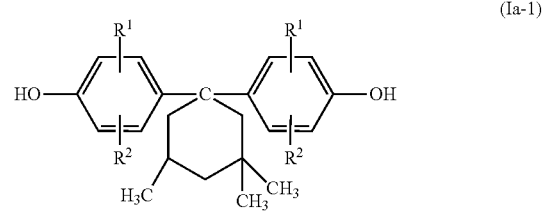

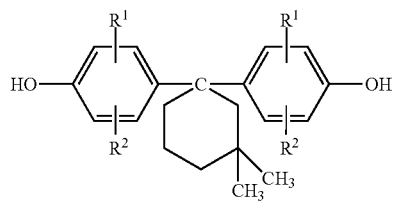

(Ia-2)

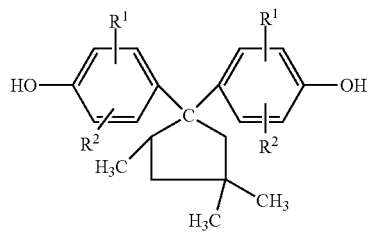

(Ia-3)

A very particularly preferred dihydroxydiphenylcycloalkane of formula (Ia) is 1,1-bis(4-hydroxyphenyl)-3,3,5-trimethylcyclohexane (formula (Ia-1) where $R^1$ and $R^2$=H).

Such polycarbonates may be prepared from dihydroxydiphenylcycloalkanes of formula (Ia) according to EP-A 359 953.

Particularly preferred dihydroxyaryl compounds are resorcinol, 4,4'-dihydroxydiphenyl, bis(4-hydroxyphenyl)diphenylmethane, 1,1-bis(4-hydroxyphenyl)-1-phenylethane, bis(4-hydroxyphenyl)-1-(1-naphthyl)ethane, bis(4-hydroxyphenyl)-1-(2-naphthyl)ethane, 2,2-bis(4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)-3,3,5-trimethylcyclohexane, 1,1'-bis(4-hydroxyphenyl)-3-diisopropylbenzene and 1,1'-bis(4-hydroxyphenyl)-4-diisopropylbenzene.

Very particularly preferred dihydroxyaryl compounds are 4,4'-dihydroxydiphenyl and 2,2-bis(4-hydroxyphenyl)propane.

It is possible to use either one dihydroxyaryl compound to form homopolycarbonates or different dihydroxyaryl compounds to form copolycarbonates. It is possible to use either one dihydroxyaryl compound of formula (I) or (Ia) to form homopolycarbonates or two or more dihydroxyaryl compounds of formula(e) (I) and/or (Ia) to form copolycarbonates. The various dihydroxyaryl compounds may be interconnected in random or blockwise fashion. In the case of copolycarbonates composed of dihydroxyaryl compounds of formulae (I) and (Ia), the molar ratio of dihydroxyaryl compounds of formula (Ia) to the other dihydroxyaryl compounds of formula (I) that are optionally usable as well is preferably between 99 mol % of (Ia) to 1 mol % of (I) and 2 mol % of (Ia) to 98 mol % of (I), preferably between 99 mol % of (Ia) to 1 mol % of (I) and 10 mol % of (Ia) to 90 mol % of (I), and especially between 99 mol % of (Ia) to 1 mol % of (I) and 30 mol % of (Ia) to 70 mol % of (I).

A very particularly preferred copolycarbonate can be prepared using 1,1-bis(4-hydroxyphenyl)-3,3,5-trimethylcyclohexane and 2,2-bis(4-hydroxyphenyl)propane dihydroxyaryl compounds of formulae (Ia) and (I).

Suitable carbonic acid derivatives may be, for example, diaryl carbonates of general formula (II)

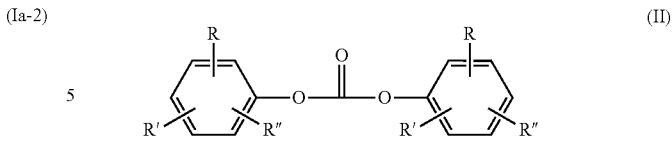

(II)

where

R, R' and R'' are the same or different and are independently hydrogen, linear or branched $C_1$-$C_{34}$-alkyl, $C_7$-$C_{34}$-alkylaryl or $C_6$-$C_{34}$-aryl, R may additionally also be —COO—R''' where R''' is hydrogen, linear or branched $C_1$-$C_{34}$-alkyl, $C_7$-$C_{34}$-alkylaryl or $C_6$-$C_{34}$-aryl.

Preferred diaryl carbonates are, for example, diphenyl carbonate, methylphenyl phenyl carbonates and di(methylphenyl) carbonates, 4-ethylphenyl phenyl carbonate, di(4-ethylphenyl) carbonate, 4-n-propylphenyl phenyl carbonate, di(4-n-propylphenyl) carbonate, 4-isopropylphenyl phenyl carbonate, di(4-isopropylphenyl) carbonate, 4-n-butylphenyl phenyl carbonate, di(4-n-butylphenyl) carbonate, 4-isobutylphenyl phenyl carbonate, di(4-isobutylphenyl) carbonate, 4-tert-butylphenyl phenyl carbonate, di(4-tert-butylphenyl) carbonate, 4-n-pentylphenyl phenyl carbonate, di(4-n-pentylphenyl) carbonate, 4-n-hexylphenyl phenyl carbonate, di(4-n-hexylphenyl) carbonate, 4-isooctylphenyl phenyl carbonate, di(4-isooctylphenyl) carbonate, 4-n-nonylphenyl phenyl carbonate, di(4-n-nonylphenyl) carbonate, 4-cyclohexylphenyl phenyl di(4-cyclohexylphenyl) carbonate, carbonate, 4-(1-methyl-1-phenylethyl)phenyl phenyl carbonate, di[4-(1-methyl-1-phenylethyl)phenyl] carbonate, biphenyl-4-yl phenyl carbonate, di(biphenyl-4-yl) carbonate, 4-(1-naphthyl)phenyl phenyl carbonate, 4-(2-naphthyl) phenyl phenyl carbonate, di[4-(1-naphthyl)phenyl] carbonate, di[4-(2-naphthyl)phenyl] carbonate, 4-phenoxyphenyl phenyl carbonate, di(4-phenoxyphenyl) carbonate, 3-pentadecylphenyl phenyl carbonate, di(3-pentadecylphenyl) carbonate, 4-tritylphenyl phenyl carbonate, di(4-tritylphenyl) carbonate, (methyl salicylate) phenyl carbonate, di(methyl salicylate) carbonate, (ethyl salicylate) phenyl carbonate, di(ethyl salicylate) carbonate, (n-propyl salicylate) phenyl carbonate, di(n-propyl salicylate) carbonate, (isopropyl salicylate) phenyl carbonate, di(isopropyl salicylate) carbonate, (n-butyl salicylate) phenyl carbonate, di(n-butyl salicylate) carbonate, (isobutyl salicylate) phenyl carbonate, di(isobutyl salicylate) carbonate, (tert-butyl salicylate) phenyl carbonate, di(tert-butyl salicylate) carbonate, di(phenyl salicylate) carbonate and di(benzyl salicylate) carbonate.

Particularly preferred diaryl compounds are diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl) phenyl phenyl carbonate, di[4-(1-methyl-1-phenylethyl) phenyl] carbonate and di(methyl salicylate) carbonate. Diphenyl carbonate is very particularly preferred.

It is possible to use either one diaryl carbonate or different diaryl carbonates.

For control or variation of the end groups, it is additionally possible to use, for example, one or more monohydroxyaryl compound(s) as chain terminators that were not used for preparation of the diaryl carbonate(s) used. These may be those of the general formula (III)

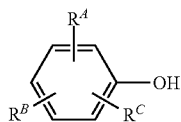

(III)

where
- $R^A$ is linear or branched $C_1$-$C_{34}$-alkyl, $C_7$-$C_{34}$-alkylaryl, $C_6$-$C_{34}$-aryl or —COO—$R^D$ where $R^D$ is hydrogen, linear or branched $C_1$-$C_{34}$-alkyl, $C_7$-$C_{34}$-alkylaryl or $C_6$-$C_{34}$-aryl, and
- $R^B$, $R^C$ are the same or different and are independently hydrogen, linear or branched $C_1$-$C_{34}$-alkyl, $C_7$-$C_{34}$-alkylaryl or $C_6$-$C_{34}$-aryl.

Such monohydroxyaryl compounds are, for example, 1-, 2- or 3-methylphenol, 2,4-dimethylphenol 4-ethylphenol, 4-n-propylphenol, 4-isopropylphenol, 4-n-butylphenol, 4-isobutylphenol, 4-tert-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenylethyl)phenol, 4-phenylphenol, 4-phenoxyphenol, 4-(1-naphthyl)phenol, 4-(2-naphthyl)phenol, 4-tritylphenol, methyl salicylate, ethyl salicylate, n-propyl salicylate, iso-propyl salicylate, n-butyl salicylate, isobutyl salicylate, tert-butyl salicylate, phenyl salicylate and benzyl salicylate. Preference is given to 4-tert-butylphenol, 4-isooctylphenol and 3-pentadecylphenol. Suitable branching agents may include compounds having three or more functional groups, preferably those having three or more hydroxyl groups.

Suitable compounds having three or more phenolic hydroxyl groups are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenyl-methane, 2,2-bis(4,4-bis(4-hydroxyphenyl)cyclohexyl]propane, 2,4-bis(4-hydroxyphenylisopropyl)-phenol and tetra(4-hydroxyphenyl)methane.

Other suitable compounds having three or more functional groups are, for example, 2,4-dihydroxybenzoic acid, trimesic acid/trimesoyl chloride, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The plastic part containing the abovementioned thermoplastic polymers may be extruded, coextruded, cast, three-dimensionally printed and/or injection molded. The plastic part may also be a three-dimensional plastic part. It is likewise possible that the plastic part may also be selected from plastic parts comprising a layer construction such as for example films, film layer laminates and/or sheets as well as combinations thereof, such as films that have been subjected to film insert molding and contain the polymers described hereinabove. The plastic part is particularly preferably a film, film layer laminate and/or a sheet containing the abovementioned polymers produced by extrusion and/or coextrusion.

In a preferred embodiment the plastic part (A), in particular thermoplastic plastic part, very particularly thermoplastic plastic part comprising a layer construction, comprises at least one additive which has an absorption maximum in the wavelength range of the employed focused, preferably nonionizing, electromagnetic radiation or the plastic part (A) is coated with at least one additive in the form of a coating composition which has an absorption maximum in the wavelength range of the employed focused, preferably nonionizing, electromagnetic radiation.

In a preferred embodiment of the process the additive comprises at least one or more organic and/or inorganic IR absorbers.

Suitable additives include in principle all laser-sensitive additives, so-called laser marking additives, i.e. additives composed of an absorber in the wavelength range of the radiation (C) to be used. The additive preferably comprises at least one or more organic and/or inorganic IR absorbers, preferably inorganic IR absorbers. Such additives and the use thereof in molding compounds are described for example in WO-A 2004/50766 and WO-A 2004/50767 and are commercially available from DSM under the brand name Micabs™.

Suitable organic IR absorbers are for example compounds having the highest possible absorption between 700 nm and 2500 nm (near-infrared=NIR). Suitable infrared absorbers include for example those known from the literature as described by substance class for example in M. Matsuoka, Infrared Absorbing Dyes, Plenum Press, New York, 1990. Particularly suitable are infrared absorbers from the substance classes comprising the azo, azomethine, methine, anthraquinone, indanthrone, pyranthrone, flavanthrone, benzanthrone, phthalocyanine, perylene, dioxazine, thioindigo, isoindoline, isoindolinone, quinacridone, pyrrolopyrrole or quinophthalone pigments as well as metal complexes of azo, azomethine or methine dyes or metal salts of azo compounds. Among these, phthalocyanines and naphthalocyanines are very particularly suitable. On account of their improved solubility in thermoplastic plastics phthalocyanines and naphthalocyanines having bulky side groups are preferable. Suitable inorganic IR absorbers are, for example, mixed oxides of metals such as for example phosphorus-containing tin-copper mixed oxides, as described in WO-A 2006/042714 for example, those from the group of borides and/or tungstates and mixtures thereof, preferably at least one or more IR absorbers from the group of borides and/or tungstates and mixtures thereof, more preferably at least one or more IR absorbers from the group of tungstates.

Suitable inorganic IR absorbers from the group of borides include for example compounds of the type $M_xB_y$ (M=La, Ce, Pr, Nd, Tb, Dy, Ho, Y, Sm, Eu, Er, Tm, Yb, Lu, Sr, Ti, Zr, Hf, V, Ta, Cr, Mo, W and Ca; and x and y are integers from 1 to 6) such as lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride ($CrB$ and $CrB_2$), molybdenum boride ($MoB_2$, $Mo_2B_5$ and $MoB$), tungsten boride ($W_2B_5$) or combinations thereof. Suitable inorganic IR absorbers from the group of tungstates also include for example those from the group of tungsten compounds of the type $W_yO_z$ (W=tungsten, O=oxygen; z/y=2.20-2.99) and/or $M_xW_yO_z$ (M=H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Sc, Br, Te, Ti, Nb, V, Mo, Ta, Re, Be, Hf, Os, Bi; x/y=0.001-1.000; z/y=2.2-3.0), wherein elements preferred as M are H, Cs, Rb, K, Tl, In, Ba, Li, Ca, Sr, Fe and Sn, among which very particular preference is given to Cs. Particular preference is given to $Ba_{0.33}WO_3$, $Tl_{0.33}WO_3$, $K_{0.33}WO_3$, $Rb_{0.33}WO_3$, $Cs_{0.33}WO_3$, $Na_{0.33}WO_3$, $Na_{0.75}WO_3$, and mixtures thereof. In a particular embodiment of the present invention, the sole use of $Cs_{0.33}WO_3$ as inorganic IR absorber is very particularly preferred. Likewise preferred are Cs/W ratios of 0.20 and 0.25.

Among the inorganic IR absorbers the tungstates are preferable over the borides on account of their low inherent coloration provided that the process according to the invention is to be carried out on plastic parts having a radiation permeability of $\geq 10\%$ to $\leq 99\%$, preferably of $\geq 30\%$ to $\leq 95\%$, particularly preferably $\geq 40\%$ to $\leq 93\%$, for the chosen radiation determined by the UV-VIS-NIR-MIR method according to DIN EN ISO/IEC 17025.

Such tungstates are prepared by mixing, for example, tungsten trioxide, tungsten dioxide, a hydrate of a tungsten oxide, tungsten hexachloride, ammonium tungstate or tungstic acid and optionally further salts containing the element M, for example cesium carbonate, in particular stoichiometric ratios such that the molar ratios of the individual components are given by the formula $M_xW_yO_z$. This mixture is subsequently treated in a reducing atmosphere, for example an argon-hydrogen atmosphere, at temperatures between 100° C. and 850° C. and finally the obtained powder is heat-treated in an inert gas atmosphere at temperatures between 550° C. and 1200° ° C. The inorganic IR absorber nanoparticles of the invention may be produced by mixing the IR absorber with the dispersants described hereinbelow and further organic solvents, for example toluene, benzene or similar aromatic hydrocarbons, and grinding in suitable mills, for example ball mills, with addition of zirconium oxide (for example having a diameter of 0.3 mm) to produce the desired particle size distribution. The nanoparticles are obtained in the form of a dispersion. After grinding, it is optionally possible to add further dispersants. The solvent is removed at elevated temperatures and reduced pressure. Preference is given to nanoparticles having an average size smaller than 200 nm, more preferably smaller than 100 nm. The size of the particles can be determined with the aid of transmission electron microscopy (TEM). Measurements of this kind on IR absorber nanoparticles are described, for example, in Adachi et al., J. Am. Ceram. Soc. 2008, 91, 2897-2902.

Production of the preferred tungstates is more particularly described for example in EP-A 1 801 815 and said tungstates are commercially available for example from Sumitomo Metal Mining Co., Ltd. (Japan) under the designation YMDS 874.

For example for use in plastic parts (A) comprising transparent thermoplastics having a radiation permeability for the selected radiation of $\geq 10\%$ to $\leq 99\%$, preferably of $\geq 30\%$ to $\leq 95\%$, particularly preferably $\geq 40\%$ to $\leq 93\%$, determined according to the UV-VIS-NIR-MIR method according to DIN EN ISO/IEC 17025, the thus obtained particles are dispersed in an organic matrix, for example in an acrylate, and optionally ground as described hereinabove in a mill using suitable auxiliaries, for example zirconium dioxide, and optionally using organic solvents, for example toluene, benzene or similar hydrocarbons.

Suitable polymer-based dispersants are, in particular, dispersants having high transmittance, for example polyacrylates, polyurethanes, polyethers, polyesters or polyesterurethanes and polymers derived therefrom.

Preferred dispersants are polyacrylates, polyethers and polyester-based polymers, and particularly preferred dispersants of high thermal stability are polyacrylates, for example polymethylmethacrylate, and polyesters. It is also possible to use mixtures of these polymers or else copolymers based on acrylate. Dispersing auxiliaries of this kind and methods for production of tungstate dispersions are described, for example, in JP 2008214596 and in Adachi et al. J. Am. Ceram. Soc. 2007, 90 4059-4061. Suitable dispersants are commercially available.

Polyacrylate-based dispersants in particular are suitable. Such suitable dispersants are obtainable, for example, from Ciba Specialty Chemicals under the trade names EFKA™, for example EFKA™ 4500 and EFKA® 4530. Polyester-containing dispersants are likewise suitable. They are obtainable, for example, from Avecia under the Solsperse™ trade name, for example Solsperse™ 22000, 24000SC, 26000, 27000. Polyether-containing dispersants are also known, for example, under the Disparlon™ DA234 and DA325 trade names from Kusumoto Chemicals. Polyurethane-based systems are also suitable. Polyurethane-based systems are obtainable from Ciba Specialty Chemicals under the EFKA™ 4046, EFKA™ 4047 trade name. Texaphor™ P60 and P63 are corresponding trade names from Cognis. The amount of the IR absorber in the dispersant may be 0.2% by weight to 50.0% by weight, preferably 1.0%-40.0% by weight, more preferably 5.0%-35% by weight and most preferably 10.0%-30% by weight based on the dispersion of the inorganic IR absorber used in accordance with the invention. The overall composition of the ready-to-use IR absorber formulation may include not only the pure IR absorber material and the dispersant but also further auxiliaries, for example zirconium dioxide, and residual solvents, for example toluene, benzene or similar aromatic hydrocarbons.

There are no limitations whatsoever to the amount of the inorganic IR absorbers according to the invention, particularly preferably those from the group of tungstates, in the polymer compositions of the plastic parts. However, the inorganic IR absorbers, especially the tungstates, may typically be used in an amount of $\geq 0.7\%$ by weight to $\leq 4.5\%$ by weight, preferably $\geq 0.6\%$ by weight to $\leq 2\%$ by weight and more preferably $\geq 0.7\%$ by weight to $\leq 1.5\%$ by weight, calculated as the solids fraction of inorganic IR absorber in the total polymer composition.

In the present context, the term "solids fraction of inorganic IR absorber", especially tungstate, means the inorganic IR absorber, especially the tungstate, as a pure substance and not as a dispersion, suspension or other preparation containing the pure substance, where the contents of IR additive, especially the tungstate content, reported hereinafter always relate to this solids fraction unless explicitly stated otherwise.

In a further embodiment further IR absorbers may optionally be employed in addition to the tungstates IR absorbers, wherein the proportion/amount thereof in such a mixture is always below that of the abovedescribed tungstates. In the case of mixtures, preference is given to compositions containing two to five (inclusive) and particular preference to two or three different IR absorbers. The further IR absorbers are preferably selected from the group of borides and tin oxides, more preferably $LaB_6$ or antimony-doped tin oxide or indium tin oxide.

Such mixtures of IR absorbers predominantly occur in applications where intrinsic coloring of the component up to a Delta E of 20, preferably up to a Delta E of 15, relative to the plastic part without IR absorbers is acceptable.

The at least one additive which has an absorption maximum in the wavelength range of the employed focused, preferably nonionizing, electromagnetic radiation may be present in the plastics part.

In a preferred embodiment the color ribbon (B) comprises at least one colorant, preferably at least one dye, or mixtures thereof which are detachable from the color| ribbon by heating. The colorant may be any material not transparent in the visible wavelength range which has been introduced into the color ribbon (B) such that it detaches therefrom upon heating. The colorant is preferably selected from the group consisting of a dye, a color pigment, a colored mineral or a mixture of at least two thereof.

In a preferred embodiment of the process the color ribbon (B) comprises a dye, particularly preferably at least one dye from the group of solvent dyes and/or disperse dyes according to the Colour Index classification or mixtures of these dyes.

The Colour Index (CI) of the Society of Dyers and Colourists and the American Association of Textile Chemists and Colorists unambiguously characterizes all colorants via the group name and the number for the chemical composition/chemical structure.

Colorants from the group of solvent dyes according to the Colour Index classification may be for example the so-called Macrolex™ colorants from Lanxess AG, Germany. Examples include Macrolex™ Blue 3R, Macrolex™ Red H, Macrolex™ Yellow 6G (Solvent Yellow 179 according to CI), Macrolex™ Violet Red R (Disperse Violet 31 according to CI), Macrolex™ Orange R (Solvent Orange 107 according to CI) or mixtures of these dyes.

Dyes from the group of the disperse dyes according to the Colour Index classification may be for example diazo, diphenylamine and anthraquinone compounds, acetate dyes, disperse dyes and/or dispersol dyes and include disperse blue #3, disperse blue #14, disperse yellow #3, disperse red #134 and disperse red #7. The classification and description of the abovementioned dyes is in accordance with "The Colour Index", 3rd edition, joint publication of the Society of Dyes and Colors and the American Association of Textile Chemists and Colorists (1971). Very generally, the dyes may be used either as a single dye constituent or as a component of a mixture according to the desired color. Thus the term "dye" used here also encompasses dye mixtures.

Suitable dyes include water-insoluble diazo-diphenylamine and anthraquinone compounds. Particularly suitable are acetate dyes, dispersed acetate dyes, dispersion dyes and dispersol dyes, as disclosed in the Colour Index, $3r^d$ edition, volume 2, The Society of Dyes and Colourists, 1971, p. 2479 and 2187-2743. Preferred dispersed dyes include Dystar's Palanil Blue E-R150 (anthraquinone/disperse blue), DIANIX Orange E-3RN (azo dye/Cl disperse-Orange 25) and the abovementioned Macrolex™ dyes as solvent dyes.

The color ribbon (B) preferably comprises a dye and/or a dye mixture selected from the group of the disperse dyes according to the Colour Index classification, very particularly a dye selected from the group consisting of azo, diphenylamine and anthraquinone compounds.

The color ribbon (B) further preferably comprises a dye and/or a dye mixture selected from the group of the solvent dyes according to the Colour Index classification, most preferably a dye and/or dye mixture of the Makrolex™ dyes.

The colorant, preferably the dye, may have been introduced into the color ribbon (B) using a solvent and/or dispersant. The solvent and/or dispersant employed may be a polymer material, such as polyester. Polymer materials as described for the dispersants in respect of the additive are preferred.

The irradiation of the plastic part (A) in step ii) is carried out with a focused, preferably nonionizing, electromagnetic radiation, wherein the wavelength range of the focused, preferably nonionizing, electromagnetic radiation is chosen such that the color ribbon (B) has a radiation permeability of $\geq 2\%$ to $\leq 99\%$, preferably of $\geq 5\%$ to $\leq 95\%$, particularly preferably of $\geq 10\%$ to $\leq 93\%$, for the chosen radiation determined by the UV-VIS-NIR-MIR method according to DIN EN ISO/IEC 17025-2018-03. In a preferred embodiment of the process the color ribbon (B) comprises:
  a) a polymeric carrier,
  b) at least one colorant, preferably at least one dye, particularly preferably at least one dye from the solvent dyes and/or disperse dyes according to the Colour Index classification or a mixture of the abovementioned dyes.

The polymeric carrier may be any carrier containing a polymer suitable for use with, preferably nonionizing, electromagnetic radiation, in particular polymeric carriers which do not melt during the irradiation in step iii) and are ideally transparent. Preferred polymers for construction of the polymeric carrier are polymers from the group of polyesters.

In a preferred embodiment of the process the plastic part (A) contains a layer construction, wherein this layer construction comprises at least one layer of a thermoplastic plastic.

In a preferred embodiment of the process the layer construction contains at least one layer containing at least one thermoplastic plastic and at least one further layer containing at least one thermoplastic plastic and at least one black pigment, preferably carbon black.

In a preferred embodiment the irradiation in step iii) is carried out with a pulsed laser, preferably with pulses having a duration of 1 ns to 10 000 ns, preferably of 5 ns to 5 000 ns, particularly preferably 10 ns to 1000 ns, and preferably an energy of 0.1 J to 10 kJ, particularly preferably of 0.2 J to 8 KJ, very particularly preferably of 0.5 to 5 kJ. The irradiation in step iii) is particularly preferably carried out with a pulsed laser with pulses having a duration of 1 ns to 10 000 ns and an energy of 0.1 J to 10 kJ. The irradiation in step iii) is preferably carried out with a pulsed laser with pulses having a duration of 5 ns to 5000 ns and an energy of 0.2 J to 8 kJ. The irradiation in step iii) is further preferably carried out with a pulsed laser with pulses having a duration of 10 ns to 1000 ns and an energy of 0.5 J to 5 kJ.

The laser irradiation is preferably carried out in continuous wave operation (CW laser). It is particularly preferable to employ pulsed laser radiation for the irradiation of the plastic parts. A pulse duration of the laser of fractions of seconds is sufficient to achieve a coloring of the plastic part at the laser-irradiated sites. It is preferable to employ pulse durations of $10^{-18}$ to $10^{-1}$ seconds, particularly preferably pulse durations of $10^{-9}$ to $10^{-2}$ seconds, very particularly preferably pulse durations of $10^{-6}$ to $10^{-3}$ seconds.

Varying the power of the employed laser beam for the irradiation in step ii) makes it possible to influence the intensity of the coloring at the lasered sites according to the requirements of the desired application. The higher the employed laser power the more intense the coloring at the lasered sites of the plastic part. The intermediate power range of a 7.5 watt marking laser achieves color engravings of sufficient quality. Significantly higher powers and thus also more intense colorings in the plastic part can be achieved in pulsed operation.

Varying the frequency of the employed laser beam for the radiation in step ii) makes it possible to control whether a carbonization of the plastic surface, and thus production of grey or black engravings, is to be effected or whether the engraving is to be effected in color, for example blue, magenta yellow. The process according to the invention preferably employs NdYAG lasers (neodymium-doped yttrium-aluminum-garnet lasers) to engrave plastic parts made of polycarbonate. A pulse frequency of up to 25 kHz may still be used to achieve engravings in a grey color in plastic parts made of polycarbonate. At higher frequencies (>25 kHz) and thus lower energy densities the energy of the laser is no longer sufficient to achieve black or grey colorings but engraving in blue, magenta, yellow may still be effected at these energy densities.

It is preferable to employ NdYAG lasers (neodymium-doped yttrium-aluminum-garnet lasers) in the process according to the invention. The energy input of the radiation C) in step iii) may be varied via pulses of different duration at the same power of the laser. The shorter the pulses, the higher the pulse peak energy. At pulse lengths of 1 ns to 10 000 ns pulse peaks of 10 kJ are achievable. However, color laser engraving of plastic parts may also be carried out using laser types such as are suitable for engraving and welding of plastics. For example, it is also possible to use a $CO_2$ laser. This may preferably be used to effected engraving in blue, magenta, yellow.

The color concentration of the color ribbon may also influence the intensity of the partial coloring of the plastic part after irradiation. Preference is given to a concentration of colorant, preferably dye, of 0.01% to 25% by weight, preferably 0.1% to 20% by weight, particularly preferably 0.2% to 18% by weight, based on the total weight of the color ribbon.

A preferred embodiment of the process according to the invention employs a molding made of plastic which is produced in an injection molding apparatus according to known processes such as for example in-mold decoration (IMD), film insert molding (FIM) or high pressure forming (HPF) processes.

In a further preferred embodiment of the process according to the invention the plastic part is a layer construction containing at least one layer of a thermoplastic plastic selected from polymers of ethylenically unsaturated monomers and/or polycondensates of bifunctional reactive compounds, preferably one or more polycarbonate(s) or copolycarbonate(s) based on diphenols, poly- or copolyacrylate(s) and poly- or copolymethacrylate(s), poly- or copolymer(s) of styrene, polyurethane(s) and polyolefin(s), poly- or copolycondensate(s) of terephthalic acid, poly- or copolycondensates of naphthalenedicarboxylic acid, poly- or copolycondensate(s) of at least one cycloalkyldicarboxylic acid or mixtures thereof, particularly preferably one or more polycarbonate(s) or copolycarbonate(s) based on diphenols or blends containing at least one polycarbonate or copolycarbonate.

It is very particularly preferable when the at least one layer containing at least one thermoplastic plastic is a film. It is preferable when this film has a layer thickness of ≥1 μm to ≤1000 μm, preferably ≥5 to ≤800 μm, very particularly preferably ≥10 to ≤500 μm.

For the avoidance of repetition, the following will refer to the abovementioned descriptions of the thermoplastic plastic in respect of preferred embodiments, material, composition and additives The layer construction preferably comprises at least one layer containing at least one thermoplastic plastic as described above and at least one further layer containing at least one thermoplastic plastic as described above and at least one laser-sensitive additive, preferably black pigment, particularly preferably carbon black. Such constructions are known for example from WO-A 2010/089035 and are suitable for laser engraving in black-and-white, especially for personalized laser engraving of security documents and, very particularly, of identification documents.

The layer construction preferably has at least one layer containing at least one thermoplastic plastic and at least one filler. The filler is preferably at least one color pigment and/or at least one other filler for producing a translucence of the filled layers, particularly preferably a white pigment, very particularly preferably titanium dioxide, zirconium dioxide or barium sulfate and in a preferred embodiment titanium dioxide.

The filling of a layer containing at least one thermoplastic plastic with at least one such filler improves the visibility of the incorporated script/image(s), thus also further improving the perception of improved sharpness and resolution. This layer construction is known from WO-A 2010/089035 and is described in detail therein.

The at least one layer of a thermoplastic plastic preferably comprises at least one additive which has an absorption maximum in the wavelength range of the employed focused, preferably nonionizing, electromagnetic radiation and wherein this at least one layer of a thermoplastic plastic has a radiation permeability of ≥10% to ≤99%, preferably of ≥30% to ≤95%, particularly preferably ≥40% to ≤93%, for the chosen radiation determined by the UV-VIS-NIR-MIR method according to DIN EN ISO/IEC 17025, preferably an inorganic IR absorber, particularly preferably an inorganic IR absorber from the group of tungstates. This layer preferably forms an outer layer of the layer construction which is ultimately also color laser engraved.

The layer construction preferably comprises at least one outer layer of a thermoplastic plastic containing at least one additive which has an absorption maximum in the wavelength range of the employed focused, preferably nonionizing, electromagnetic radiation and wherein this at least one layer of a thermoplastic plastic has a radiation permeability of ≥10% to ≤99%, preferably of ≥30% to ≤95%, particularly preferably ≥40% to ≤ 93%, for the chosen radiation determined by the UV-VIS-NIR-MIR method according to DIN EN ISO/IEC 17025, preferably an inorganic IR absorber, particularly preferably an inorganic IR absorber from the group of tungstates, and a further layer containing at least one thermoplastic plastic and at least one laser-sensitive additive, preferably black pigment, particularly preferably carbon black, and optionally a further layer of a thermoplastic plastic comprising a filler, preferably a white pigment, particularly preferably titanium dioxide, zirconium dioxide or barium sulfate, very particularly preferably titanium dioxide.

This embodiment makes it possible for example to combine the color laser engraving according to the invention with black laser engraving. To this end the plastic part (A) comprising the above-described layer construction may be irradiated with C) as in step iii) in the absence of the color ribbon (B) either before or after step i) or step ii). The same radiation (C) may ideally be used for this further irradiation. The irradiation with (C) in the absence of the color ribbon (B) makes it possible to apply a black engraving onto the surface, preferably in transparent and/or white layers of the layer construction arranged therebelow, at the desired site. In the case of laser engraving without the color ribbon (B) the high laser reactivity of these layer constructions results in blackening at the laser-irradiated sites. If the layer construction is in contact with the color ribbon (B) the intensity of the laser beam is attenuated by the color ribbon (B) in such a way that coloring is effected only at the irradiated sites, but no blackening of the surface of the layer construction is brought about.

The color layer thickness is preferably precisely adjusted over the entire process and is preferably kept constant over the duration of the entire process to be able to achieve uniform laser engraving. The color layer thickness is preferably 0.001 to 10 mm, particularly preferably from 0.005 to 5 mm, very particularly preferably from 0.01 to 1 mm.

The invention further provides plastic parts or plastic articles obtainable by the process according to the invention.

In a preferred embodiment of the plastic part (A) said part is a security and/or value document, very particularly preferably an identification document. In particular the security documents personalized/color engraved by the process according to the invention feature high forgery security of the applied personalized/color engraved information. The process according to the invention allows color personalization of blank documents in a decentralized and forgery-secure manner. It is additionally possible to generate tactile laser engravings in color.

EXAMPLE 1 (INVENTIVE)

Initially a plastic part (A) in the form of a laminated plastic film laminate (A) (referred to below as laminate (A)) was prepared from two different polycarbonate films, film 1) and film 2), and provided according to step i) of the process according to the invention. A color ribbon was then, on the laminate (A), laid on one of the surfaces of the laminate (A) according to step ii) and coloring using a laser was effected according to step iii).

Step i) Providing the Plastic Part (A) in the Form of a Laminate (A)

Film 1) was a Makrofol™ polycarbonate film having a thickness of 100 µm from Covestro Deutschland AG and having the following composition:
- 94.69% by weight of Makrolon™ 3108 polycarbonate from Covestro Deutschland AG
- 0.75% by weight of YMDS 874 IR absorber from Sumitomo
- 4.5% by weight of Makrolon™ 3108 powder from Covestro Deutschland AG
- 0.006% by weight (60 ppm) of lamp black 101 (carbon black from Evonik-Degussa GmbH) having an average particle size of 95 nm (according to manufacturer specifications)

Film 2) was Makrofol™ ID4-4 opaque white polycarbonate in a thickness of 500 µm from Covestro Deutschland AG.

Lamination of the films 1) and 2) to afford the laminate (A) was carried out as follows.

Films 1) and 2) were initially stacked as follows:

| | |
|---|---|
| Film 1) | 100 µm |
| Film 2) | 500 µm |
| Film 1) | 100 µm |

The film stack was placed in a Bürckle 50/100 laminating press. The films were laminated with the following laminating press settings so that both surfaces of the laminate (A) were formed by a film 1):

Heating zone: Temperature 190°, duration 8 minutes, pressure 60 N/cm$^2$

Cooling zone: temperature 38° C., duration 10 minutes, pressure 100 N/cm$^2$

The laminate (A) from step i) was placed on the workpiece carrier of a Foba D84S laser apparatus, so that one surface of the laminate (A) lay on the workpiece carrier and the opposite surface was facing the laser. The laser was a diode-pumped NdYAG laser, which emitted at 1064 nm with a power of about 60 watts.

Step ii) Laying the Color Ribbon

A color ribbon was then laid on the laminate with the dye-coated side in contact with one of the films 1) of the laminate (A). A CY-35K-75D color ribbon from DNP Co., Ltd, was used. The color ribbon was fixed to the laminate (A) in the edge region and air extraction was used to generate a negative pressure between the laminate (A) and the color ribbon to prevent air inclusions from forming between the laminate (A) and the color ribbon. The slight negative pressure of about 100 mbar was maintained over the entire duration of the irradiation in step iii).

Step iii) Irradiation

The NdYAG laser was focused on the surface of the color ribbon at the site where it was in contact with the laminate (A). For the laser engraving the laser was set to a frequency of 30 kHz and a current of 28 amps. The advancement rate of the laser was 100 mm/s.

The lasering was performed through the blue field of the color ribbon.

Letters, numbers and symbols were engraved on the laminate. The engravings had an intense coloring. The laser engraving had also taken a tactile form. The engraving was embossed enough to be felt and clearly visible.

The laser engraving was repeated a second time but without using the color ribbon. The laminate surface was irradiated directly by the laser. Lasering was carried out with altered parameters, namely at 5 kHz and 32 amps. The engraved letters numbers and symbols thus appeared in deep black.

Determination of penetration depth of the dye into the laminate (A).

An approximately 20 µm-thick strip was cut from the cross section of the laminate (A) using a Thermo scientific HM 355S microtome. Viewing the cross section under a microscope at 100 fold magnification in transmitted light made it possible to verify that complete coloring of the 100 µm-thick film 1) had occurred. While the coloring was more intense in the outer region of the irradiated film 1) it reached up to the inner boundary to the adjacent film 2), i.e. to a depth of 100 µm.

EXAMPLE 2) (NONINVENTIVE) LASER ENGRAVING IN LIQUID

For comparison, the same plastic part (A) as described for example 1) in the form of a laminated plastic film laminate (A) (referred to below as laminate (A)) was used for coloring using a coloring bath as described in the prior art in patent application WO-A 2017/167651.

The laminate (A), produced and constructed as described in step i) of example 1), was immersed in a coloring bath to an immersion depth of 0.5 mm. Immersion depth is to be understood as meaning the path/the penetration depth of the employed radiation C) into the coloring bath up to the surface of the plastic part (A) onto which the partial coloring is to be applied.

The following composition of the coloring bath was used:
69.31% by weight of water
0.99% by weight of Macrolex® Blue 3R (dye, Lanxess AG Germany)
19.8% by weight of ethylene glycol butyl ether (EGBE), (solvent, The Dow Chemical Company)
9.9% by weight of diethylene glycol (DEG), (leveling agent, Merck KGaA)

The coloring bath with the laminate (A) was placed on the workpiece carrier of a Foba D84S laser apparatus with an NdYAG laser as used in example 1.

Generation of the Laser Engraving:

The laser was focused on the surface of the laminate (A). For the laser engraving the laser was set to a frequency of 30 kHz and a current of 28 amps. The advancement rate of the laser was 100 mm/s.

Letters, numbers and symbols were engraved on the laminate. The engravings had an intense coloring. The laser engraving had also taken a tactile form. The engraving was embossed enough to be felt and clearly visible.

The laser engraving was then repeated a second time but without using coloring liquid. The laminate surface was irradiated directly by the laser. Lasering was carried out with altered parameters, namely at 5 kHz and 32 amps. The engraved letters numbers and symbols thus appeared in deep black.

Determination of penetration depth of the dye into the laminate.

An approximately 20 μm-thick strip was cut from the cross section of the laminate using a Thermo scientific HM 355S microtome. Viewing the cross section under a microscope at 100 fold magnification in transmitted light made it possible to verify that coloring of the 100 μm-thick film 1) had occurred. The penetration depth of the coloring was only determinable in the outer region of the film 1) at a depth of not more than 25 μm.

The invention claimed is:

1. A process for partial coloring of plastic parts, the process comprising the steps of i) providing a plastic part (A) having at least one surface;
   ii) laying a color ribbon (B) containing at least one colorant on at least a portion of the at least one surface of the plastic part (A) to obtain a surface of the plastic part (A) covered with the color ribbon;
   iii) irradiating the plastic part (A) from ii) with focused, electromagnetic radiation (C) on at least a portion of the surface of the plastic part (A) covered with the color ribbon,
   wherein the partial coloring is effected substantially only at the sites on the plastic part (A) that are irradiated in step iii), wherein the wavelength range of the focused, electromagnetic radiation (C) is in a range from 200 to 20 000 nm, and
   wherein the irradiation in step iii) is carried out with a pulsed laser, with pulses having a duration of 1 ns to 10 000 ns and an energy of 0.1 J to 10 kJ.

2. The process as claimed in claim 1, wherein in a step iv) the color ribbon (B) is removed from the plastic part (A) after step iii).

3. The process as claimed in claim 1, wherein the focused, electromagnetic radiation (C) is laser radiation having a wavelength in the range from 500 to 15 000 nm.

4. The process as claimed in claim 1, wherein the plastic part (A) contains a thermoplastic plastic selected from the group consisting of polymers of ethylenically unsaturated monomers, polycondensates of bifunctional reactive compounds, polyaddition products of bifunctional reactive compounds, and combinations thereof.

5. The process as claimed in claim 1, wherein the plastic part (A) comprises at least one additive which has an absorption maximum in the wavelength range of the employed focused, electromagnetic radiation or wherein the plastic part is coated with at least one additive in the form of a coating composition which has an absorption maximum in the wavelength range of the employed focused, electromagnetic radiation.

6. The process as claimed in claim 5, wherein the additive comprises at least one or more organic and/or inorganic IR absorbers.

7. The process as claimed in claim 1, wherein the color ribbon (B) comprises at least one colorant which is detachable from the color| ribbon (B) by heating.

8. The process as claimed in claim 1, wherein the color ribbon (B) comprises at least one dye selected from the group of solvent dyes, disperse dyes according to the Colour Index classification, and mixtures of these dyes.

9. The process as claimed in claim 1, wherein the color ribbon (B) comprises:
   a) a polymeric carrier, b) at least one selected from the group consisting of a colorant, at least one dye from the solvent dyes and/or disperse dyes according to the Colour Index classification, and a mixture of the above-mentioned dyes.

10. The process as claimed in claim 1, wherein the plastic part (A) contains a layer construction comprising at least one layer of a thermoplastic plastic.

11. The process as claimed in claim 10, wherein the layer construction comprises at least one layer containing at least one thermoplastic plastic and at least one further layer containing at least one thermoplastic plastic and at least one black pigment.

12. The process as claimed in claim 1, wherein the irradiation in step iii) is carried out with a laser in continuous wave operation with a power of 1 watt to 200 watts.

13. A plastic part (A) with at least a partial coloring obtained by the process as claimed in claim 1.

14. The plastic part (A) as claimed in claim 13, wherein the plastic part (A) is one selected from the group consisting of a security document, a value document, and an identification document.

* * * * *